United States Patent Office 3,193,347
Patented July 6, 1965

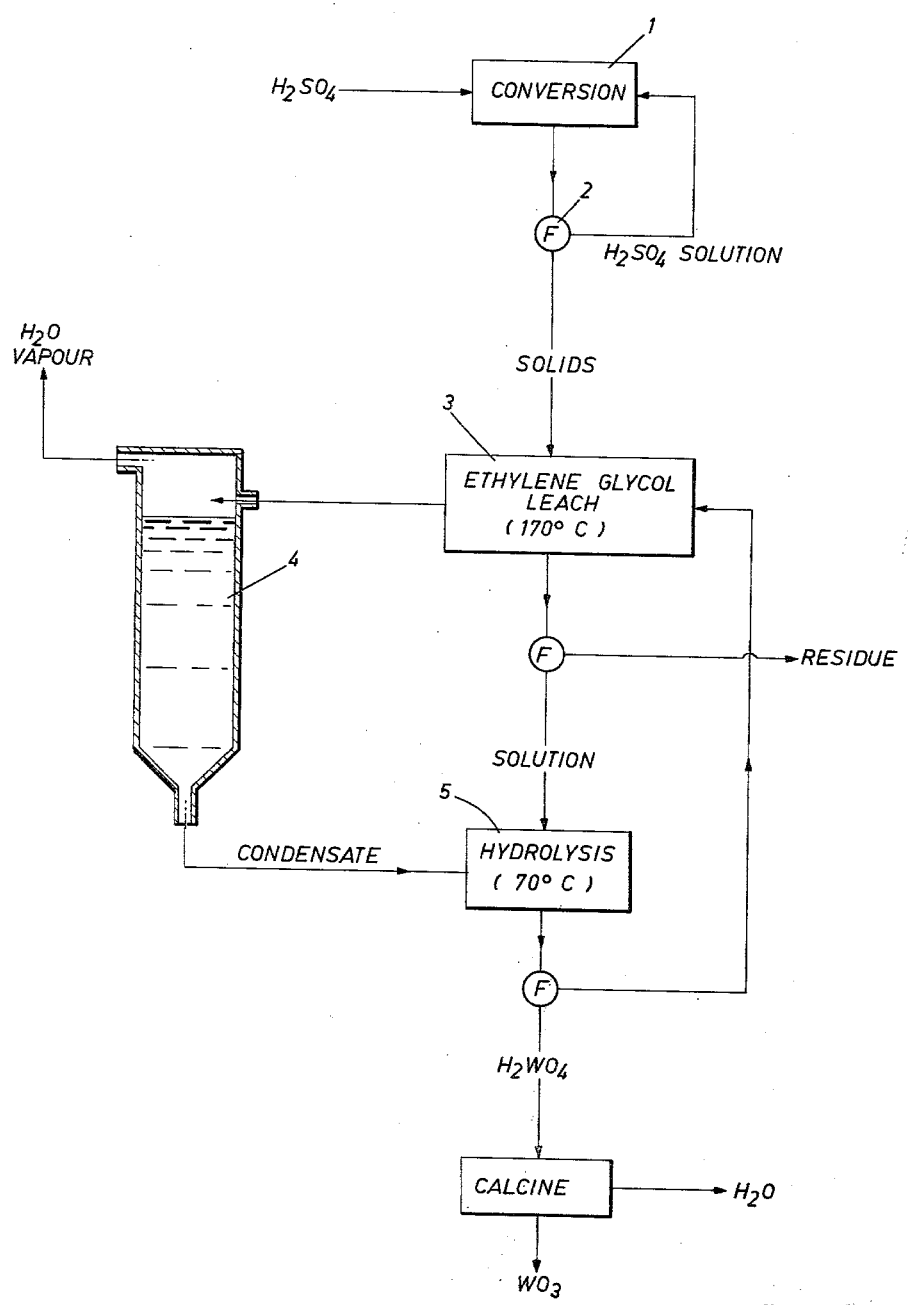

3,193,347
PROCESS FOR THE PRODUCTION OF
TUNGSTIC ACID
Frank A. Forward and Andrew I. Vizsolyi, Vancouver,
British Columbia, Canada, assignors to Sherritt Gordon
Mines Limited, Toronto, Ontario, Canada, a company
of Canada
Filed June 13, 1962, Ser. No. 202,296
10 Claims. (Cl. 23—140)

This invention relates to a process for the production of tungstic acid, $H_2WO_4$. It is particularly directed to providing a hydrometallurgical process for the treatment of tungsten bearing materials, such as ores and concentrates, which contain tungsten, such as in the form of scheelite, calcium tungstate, $CaWO_4$; wolframite, an iron-manganese tungstate having the general formula $(Fe \cdot Mn)WO_4$; ferberite, $FeWO_4$; huebnerite, $MnO \cdot WO_3$; and impure tungstic acid, to produce tungstic acid substantially free from impurities which can, if desired, be converted to tungsten oxide, $WO_3$, of high purity, by known procedures.

Conventional processes for recovering pure tungstic acid from scheelite and other ores of tungsten comprise primarily leaching with solutions of caustic soda or sodium carbonate at elevated temperatures and pressures to produce sodium tungstate which is separated from the gangue or waste materials, such as by filtration.

An alternative process for scheelite treatment is to digest the scheelite with hydrochloric acid to produce a solid mixture which contains tungstic acid and gangue or waste material. After separation of the solids from the solution, such as by filtration, the tungstic acid content is dissolved in sodium hydroxide to produce sodium tungstate which is separated from the undissolved residue by filtration. The sodium tungstate solution is then treated by hydrochloric acid addition to produce tungstic acid or by calcium chloride addition to produce synthetic calcium tungstate which, in turn, is treated with hydrochloric acid to produce tungstic acid. The resulting tungstic acid is either calcined to produce tungstic oxide or is first dissolved in ammonium hydroxide to produce ammonium tungstate solution which, in turn, is evaporated to produce ammonium paratungstate crystals. These crystals can be heated to produce tungstic oxide and regenerate ammonia.

Known processes for the production of tungstic acid have the disadvantages that it may be necessary to conduct them at high temperatures and pressures; they require relatively large amounts of reagents, such as sodium hydroxide or sodium carbonate and hydrochloric acid; and they do not necessarily provide for the separation of impurities usually associated with the tungsten in mineral deposits. Thus, purification steps may be required to separate and remove such elements as arsenic, phosphorus, molybdenum and silica. Such steps usually involve the preparation of ammonium paratungstate if high purity tungstic acid is to be produced. The ammonia process is subject to the disadvantage that ammonia should be recovered to minimize the costs involved in the overall process, thus necessitating the use of closed reaction vessels and the provision of ammonia recovery apparatus.

We have found that tungstic acid, $H_2WO_4$, substantially free from impurities and in condition for conversion to tungstic oxide of high purity, can be produced by a sequence of easily executed operations which can be conducted at relatively low temperatures with very low loss of expensive reagents.

The process for the production of tungstic acid from tungsten bearing material of this invention comprises, in general, the steps of:

(a) Leaching a solid tungstic acid containing mixture with a leach solution comprising an alcohol selected from the group consisting of dihydric and polyhydric aliphatic alcohols which are completely miscible with water at atmospheric temperature and which have boiling points above about 100° C. to extract tungsten and dissolve it in the leach solution;

(b) Separating undissolved residue from the leach solution;

(c) Hydrolyzing dissolved tungsten in the leach solution in the presence of water provided in amount at least sufficient to combine with dissolved tungsten to form and precipitate tungstic acid substantially free from impurities; and (d) Separating precipitated tungstic acid from the leach solution.

An understanding of the process which forms the subject matter of this invention and the manner in which it can be conducted can be obtained from the following description, reference being made to the accompanying drawing which is in the form of a flow sheet of a preferred embodiment of the invention.

The process is described in detail hereinafter as applied to the treatment of a scheelite concentrate which contained 75.5% tungstic oxide, $WO_3$; 19.8% lime, $CaO$; 2.1% silica, $SiO_2$; 0.21% alumina, $Al_2O_3$; 0.03% phosphorus, P; and 0.11% arsenic, As. The end product of the process is tungstic acid substantially free from impurities which can be converted to tungstic oxide of high purity, if desired, by known procedures. It will be understood that the process can be used with advantage in the treatment of other tungsten bearing materials, such as ores and concentrates containing wolframite, huebnerite and ferberite and, also, for the purification of impure tungstic acid prepared by conventional methods.

Processes are well known for converting the tungstic oxide content of scheelite to tungstic acid. Such processes include digesting the scheelite in an aqueous solution of an inorganic acid, such as hydrochloric or sulphuric acid. In the embodiment of the invention illustrated in the drawing, particles of scheelite, ground to from about 100 to smaller than about 40 microns were dispersed, in a conversion step 1, in an aqueous sulphuric acid solution which contained about 15% sulphuric acid by weight, and digested with active agitation at 100° C. for about an hour. Sufficient water was provided to ensure the conversion of all the tungstic oxide to tungstic acid and to solubilize all acid soluble impurities present in the starting material. The conversion step 1 proceeds at a satisfactory rate at a temperature from atmospheric to about 120° C., for example, from about 60° C. to about 100° C., which makes unnecessary the use of pressure equipment. The reaction which takes place in the conversion step can be expressed by the equation:

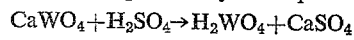

$$CaWO_4 + H_2SO_4 \rightarrow H_2WO_4 + CaSO_4$$

The sulphuric acid solution used in the conversion step should contain water. Very little conversion is obtained in the absence of water. Sulphuric acid is provided in amount at least sufficient to combine with the tungsten and calcium contents as tungstic acid and hydrated calcium sulphate respectively.

The solids residue from conversion step 1, which contained the solid tungstic acid, was separated from the sulphuric acid solution by filtration in filter 2. Filtrate, which had a pH less than 1, was replenished with sulphuric acid and re-cycled to the conversion step.

In the leaching step 3, the tungstic acid containing solids are leached with a dihydric or polyhydric aliphatic alcohol. There are many dihydric and polyhydric aliphatic alcohols. Those which can be used with advantage to leach tungstic acid bearing solids for the extraction of tungstic acid therefrom according to the process of this invention are those which are completely miscible in water at atmospheric temperature and which have boiling points above about 100° C. Ethylene glycol and glycerol are illustrative of dihydric and polyhydric aliphatic alcohols which are useful for the purpose of this invention. They are completely miscible in water at atmospheric temperature and have boiling points of 197.5° C. and 290° C. respectively.

We have found that the rate of the extraction and dissolution of the tungstic acid content of the solids mixture charged into the leaching step is substantially improved if a halogen is present with the dihydric or polyhydric aliphatic alcohol in the leach solution. The halogen can be provided in the form of a halide which is soluble in the solution, such as a fluoride, bromide, iodide or chloride compound. Hydrochloric acid is a preferred compound as it is relatively inexpensive, readily available and functions very satisfactorily in the leaching step and in the hydrolysis step which follows the leaching step.

The amount of halogen provided in the solution in the leaching stage is important. Leaching can be conducted without the presence of the halogen in the leach solution but the leaching rate is relatively slow. The addition of the halogen increases the reaction rate and permits optimum extraction and dissolution within an economically practical time period. Also, the presence of the halogen in the solution during the hydrolysis step, discussed in detail hereinafter, improves the rate of precipitation of tungstic acid and the physical characteristics of the tungstic acid precipitated in that step. Halogen provided in the leaching step preferably is present in the hydrolysis step. When providing the halogen in the form of a soluble halide, we have found that the solution should contain the equivalent of at least about 0.25%, by weight, and, preferably, within the range of from about 0.5% to about 2.0%, by weight, hydrogen chloride. The halide appears to have a catalytic effect during the leaching operation.

The tungstic acid bearing solids are dispersed in the leach solution, such as ethylene glycol, to form a slurry which contains from about 10 to about 20% solids and are leached at a temperature safely above the temperature, about 125° C., at which $CaSO_4.2H_2O$ loses part of its water to form $CaSO_4.\frac{1}{2}H_2O$, which is substantially insoluble in ethylene glycol, and thus inhibit the extraction and dissolution of calcium sulphate.

The leaching temperature is important. Tungstic acid will dissolve in the leach solution at room temperature. However, extraction and dissolution are slower than at elevated temperature. Also, calcium sulphate, $$CaSO_4.2H_2O$$

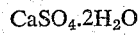

is soluble in dihydric and polyhydric aliphatic alcohols of the type used in the present process. Therefore, the leaching step should be conducted above 125° C. and preferably above about 160° C., at which temperature the calcium sulphate is substantially completely dehydrated and is insoluble in the solution. Therefore we prefer to conduct the leaching step at a temperature within the range of from above about 140° C. to below the boiling temperature of the leach solution. Under these conditions, it is found that from 95% to 99% of the tungstic acid content of the mixture charged into the leaching step is extracted and dissolved in the leach solution within about 120 minutes.

The tungstic acid bearing solids usually contain some moisture, for example from 10% to 15%. If so, water, ethylene glycol and halide compound, if used, are vapourized during the leaching step. This distillate can be passed to a rectifier 4 wherein moisture vapour, free of ethylene glycol, is separated and discharged to the atmosphere and residual solution is returned to the leaching step 3 or, as shown, to the hydrolysis step 5. This latter procedure is preferred as it provides a controlled amount of halide compound in the solution treated in that step.

Substantially pure tungstic acid is precipitated from the leach solution in the hydrolysis step 5. Factors which affect the rate and the extent of precipitation of tungstic acid in this step are the presence of halide ions and water in the leach solution and the temperature at which the step is conducted.

We have found that in the absence of water, there is very little, if any, precipitation of tungstic acid from the solution. With the addition of water to the solution, up to about 50%, by weight, precipitation of tungstic acid is relatively slow, from about 5% to about 20% of that contained in the solution at temperatures from atmospheric to about 100° C. in 12 hours.

The presence of a halide compound, accompanied by the addition of water to the solution, is effective for improving the rate and the extent of the precipitation of tungstic acid. We have found that in the presence of the halide compound in amount equivalent to at least about 0.25% and, preferably, from about 0.5% to about 2.0%, by weight, HCl and from about 10% to about 40% by weight, water, from 95% to 98% of the tungsten present in the solution precipitates from the solution as tungstic acid in about twelve hours.

Tungstic acid precipitated from the leach solution which does not contain halide compound is in the form of soft, very fine particles which are difficult to separate from the solution. However, when the solution contains a halide within the range specified and the hydrolysis step is conducted at an elevated temperature, up to about 100° C., the precipitated tungstic acid is in the form of fine, yellow, granular particles which can be separated from the solution quite easily by filtration. After washing and drying, these precipitated particles were analyzed and found to contain 92.8% tungstic oxide combined with 7.2% water.

Tungstic acid produced by the present process can be converted to tungstic oxide, $WO_3$, by conventional methods, such as by heating or ignition. Also, tungstic oxide can be reduced in the solid state to finely divided tungsten particles, such as by reaction with hydrogen.

The following Example 1 illustrates the operation of the process of this invention in the treatment of scheelite.

EXAMPLE 1

100 grams of scheelite which contained, by weight, 75.5% tungstic oxide, $WO_3$; 19.8% lime, CaO; 2.1% silica, $SiO_2$; 0.21% alumina, $Al_2O_3$; 0.03% phosphorus, P; and 0.11% arsenic, As; of a particle size smaller than about 40 microns were dispersed in 300 cc. of an aqueous solution which contained 25 cc., 47 grams, sulphuric acid, about 15% by weight free sulphuric acid solution, 283 cc. water, 6.8 g.p.l. tungstic oxide and 1.2 g.p.l. lime. The resulting slurry was actively agitated at 100° C. for 1 hour.

At the end of the conversion period, aqueous sulphuric acid solution containing 6.8 g.p.l. tungstic oxide, 1.2 g.p.l. lime and 54 g.p.l. sulphuric acid and having a pH below 1, was separated from the solids residue by filtration, replenished with sulphuric acid and re-cycled to the conversion step.

The solids residue, 146 grams, from the conversion step contained 51.5% tungstic oxide, 13.5% lime, 6.7% sulphur, 1.5% silica, 4.5% combined water and 11% moisture. These solids were dispersed in the leaching step in 1111 cc. of re-cycle leach solution from the hydrolysis step which contained 1.4 g.p.l. tungstic oxide, 2.4 g.p.l. lime, 6.2 g.p.l. chloride radical, probably in the form of hydrochloric acid or ethylene glycol chlorohydrin, 920 g.p.l. ethylene glycol, and 162 g.p.l. water. Leaching was conducted at 170° C. for 2 hours. Distillate from the leaching step was passed to a rectifier and was separated into 17 grams of water vapour and 226 cc. of condensate which contained 180 g.p.l. ethylene glycol, 12.6 g.p.l. chloride radical, and 820 g.p.l. water.

At the end of the leaching period, the undissolved residue was separated from the leach solution by filtration.

The residue, which weighed 50 grams and contained, by weight, 4.0% tungstic oxide, 39.6% lime, 19.3% sulphur, and 4.2% silica, was discarded.

885 cc. of leach solution recovered from the leaching step contained 86 g.p.l. tungstic oxide, $WO_3$, 3.3 g.p.l. lime, 4.5 g.p.l. chloride radical, and 1120 g.p.l. ethylene glycol. This solution was passed to the hydrolysis step wherein it was mixed with the 226 cc. condensate from the rectifier and hydrolyzed at 70° C. for 2 hours. At the end of this period, ethylene glycol and water were separated from the precipitated tungstic acid by filtration and recycled to the leaching step. The tungstic acid, which weighed 79.2 grams, after washing and drying, contained 92.8% tungstic oxide and 7.2% combined water.

The tungstic acid was calcined at 350° C to produce 73.5 grams of light tungstic oxide of 99.9% purity. Impurities present in the tungstic oxide were, by weight, calcium, 0.03%; iron, 0.04%; magnesium, 0.02%; molybdenum less than 0.001%; and other elements less than 0.001%.

The overall recovery of tungstic oxide from the starting material was 97.4%.

The following Example 2 illustrates the results obtained in the treatment of wolframite.

EXAMPLE 2

100 grams of wolframite ore which contained, by weight, 1.5% CaO; 11.1% $SiO_2$; 5.6% Fe; 1.0% Al; 13.1% Mn; and 0.054% Mo were treated for 1 hour at 100° C. in a solution which contained 400 grams $H_2O$ and 97 grams $H_2SO_4$. Undissolved residue was separated from the solution by filtration. The solids weighed 89 grams and contained, by weight, 69.1% $WO_3$; 1.7% CaO; 0.5% Fe; 1.0% Al; 12.0% Mn; and 12.4% $SiO_2$. Calculated on the basis of the ratio of iron+manganese in the wolframite ore to iron+manganese in the residual solids the proportion of $WO_3$ converted to tungstic acid was about 40%.

The tungstic acid containing solids, 89 grams, were treated with 730 cc. of a solution which contained 712 cc. ethylene glycol and 18 cc. hydrochloric acid at 170° C. for a period of 30 minutes with constant agitation, after which the solution was separated from residual solids by filtration. The solids, which weighed 58.5 grams, analyzed 61.6% $WO_3$; trace CaO; 1.0% Fe; 2.6% Al; 18.4% Mn and 19.2% $SiO_2$. The solution, 715 cc., analyzed 31.5 g.p.l. $WO_3$; 0.75 g.p.l. CaO; 0.2 g.p.l. Mn and 0.1 g.p.l. Fe. The calculated extraction of tungstic acid present in the solids was 93%

143 cc. water and 19 cc. HCl were added to the 715 cc. of leach solution. The mixture was heated to and maintained at 70° C. with constant agitation for a period of 12 hours, following which the precipitated tungstic acid was separated by filtration. The tungstic acid, weighing 19.6 grams, was calcined at 350° C. to produce 18.4 grams of soft tungstic oxide analyzing 99.9% $WO_3$ and less than .001% molybdenum.

The following Example 3 illustrates the effect of the presence of a halogen on the hydrolysis step. The halogen was provided in the form of a halide.

EXAMPLE 3

In a series of tests, 10 ml. $H_2O$ was added to each of four 50 ml. samples of ethylene glycol leach solution which contained 50 g.p.l. $WO_3$ and solution samples were withdrawn after 2 hours and 12 hours at 70° C. The results were as follows:

| Halide added | $WO_3$ grams per litre | | Remarks |
|---|---|---|---|
| | 2 hrs. | 12 hrs. | |
| None | 44.5 | 33.0 | Colloidal ppte. |
| 3 cc. 35% HCl (6%) | 25.7 | 0.5 | Yellow crystalline. |
| 3 cc. 48% HBr | 29.7 | 2.7 | Do. |
| 3 cc. $BF_3$ ether complex | 32.8 | 8.5 | Do. |

The following Example 1 illustrates the results obtained in leaching impure tungstic acid with various monohydric and polyhydric aliphatic alcohols.

EXAMPLE 4

30 gram samples of impure tungstic acid which contained 53.0% $WO_3$ as tungstic acid were treated for 2 hours with 250 cc. solvent to which 5 cc. HCl had been added. If all the $WO_3$ were dissolved, the resultant solution would contain $$\frac{1000}{250} \times 15.9 = 63.5 \text{ g.p.l. } WO_3$$

The results set out in the following Table 1 do not represent maximum solubility but are for comparative purposes only.

*Table 1*

| Alcohol | Formula | Type | Boiling pt., ° C. | Leached at ° C. | $WO_3$ dissolved in solution, grams per litre |
|---|---|---|---|---|---|
| Isobutyl | $(CH_3)_2CHCH_2OH$ | Monohydric (primary) | 108 | 100 | 1.5 |
| 1-pentanol | $(CH_3)(CH_2)_3CH_2OH$ | do | 138 | 110 | 1.3 |
| 2-pentanol-4 methyl | $(CH_3)_2CHCH_2CHOHCH_3$ | Monohydric (secondary) | 131 | 110 | 0.1 |
| nonanol | $CH_3(CH_2)_7CH_2OH$ | Monohydric (primary) | 213 | 170 | 5.7 |
| Ethylene glycol | $CH_2$—OH<br>\|<br>$CH_2$—OH | Dihydric (primary) | 197 | 170 | 63.3 |
| Propylene glycol | $CH_3$—CHOH<br>\|<br>$CH_2OH$ | do | 187 | 170 | 35.1 |
| Diethylene glycol | $CH_2OH$<br>\|<br>$CH_2$—O—$CH_2$—$CH_2OH$ | do | 244 | 170 | 17.1 |
| Triethylene glycol | $CH_2$—O—$CH_2$—$CH_2OH$<br>\|<br>$CH_2$—O—$CH_2$—$CH_2OH$ | do | 288 | 170 | 6.7 |
| 1.5 pentanediol | HO—$CH_2$—$(CH_2)_3$—$CH_2OH$ | do | 242 | 170 | 2.4 |
| Glycerol | $CH_2OH$<br>\|<br>CHOH<br>\|<br>$CH_2OH$ | Polyhydric | 290 | 170 | 48.3 |
| 1-2-6 hexanetriol | HO—$CH_2$—CHOH$(CH_2)_3$—$CH_2OH$ | do | 178 | 170 | 46.1 |
| Water | | | 100 | 90 | .07 |

The process of this invention possesses many important advantages. A high extraction and recovery of tungstic oxide substantially free from impurities is obtained from the starting material. The conventional reagents used are readily available and inexpensive. Tungstic acid is highly soluble in the dihydric or polyhydric aliphatic alcohol leaching reagent and there are ony minor mechanical losses of reagent during its cyclic circulation through the leaching, hydrolysis and filtration steps. Only moderate temperatures are used in the operation of the process and as the several steps can be conducted at atmospheric pressure, costly high pressure equipment is not necessary.

It will be understood, of course, that modifications can be made in the specific embodiment of the invention described and illustrated herein. For example, the rectification step is described as conducted on the condensate from the leaching step. The rectification step can be applied, if desired, to all or part of the leach solution as it is re-cycled from the hydrolysis step to the leaching step. This and other modifications can be made to the specific process described and illustrated herein without departing from the scope of the invention defined by the appended claims.

What we claim as new and desire to protect by Letters Patent of the United States is:

1. The process for the production of tungsten acid substantially free from impurities which comprises the steps of:
    (a) leaching a tungstic acid containing material with a leach solution comprised of an alcohol selected from the group consisting of dihydric and polyhydric aliphatic alcohols which are completely miscible in water at atmospheric temperature and which have boiling points above 100° C. to extract and dissolve tungsten values in the leach solution;
    (b) separating undissolved residue from the leach solution;
    (c) hydrolyzing tungsten dissolved in the leach solution in a hydrolysis step in the presence of water provided in amount at least sufficient to combine with dissolved tungsten to form tungstic acid whereby tungstic acid substantially free from impurities is precipitated from the leach solution; and
    (d) separating precipitated tungstic acid from the leach solution.

2. The process according to claim 1 in which the leaching and hydrolysis steps are conducted in the presence of a halide provided in solution in amount at least equivalent to 0.25% by weight of the solution hydrogen chloride.

3. The process according to claim 2 in which the halide is provided by the addition of from about 0.5 to about 2.0% by weight of the solution hydrogen chloride.

4. The process for the production of tungstic acid from tungsten bearing material which comprises the steps of:
    (a) treating the tungsten bearing material with an aqueous inorganic acid solution to produce a mixture of solids which contains tungstic acid;
    (b) leaching the tungstic acid containing mixture with a leach solution comprising an alcohol selected from the group consisting of dihydric and polyhydric aliphatic alcohols which are completely miscible in water at standard atmospheric temperature and which have a boiling point about 100° C. and a halide in amount equivalent to from about 0.5 to about 2.0% by weight of the solution hydrogen chloride;
    (c) separating undissolved residue from the leach solution;
    (d) hydrolyzing the dissolved tungsten in the leach solution in a hydrolysis step conducted in the presence of said halide and water provided in amount at least sufficient to combine with the dissolved tungsten to form tungstic acid;
    (e) continuing the hydrolysis step to precipitate tungstic acid from solution substantially free from impurities; and
    (f) separating precipitate tungstic acid from the leach solution.

5. The process according to claim 4 in which leach solution recovered from the hydrolysis step is re-cycled to the leaching step.

6. The process according to claim 5 characterized in that distillate formed in the leaching step is collected, water vapour is separated from the distillate, and residual distillate is passed to the hydrolyzing step.

7. The process according to claim 4 in which at least part of the water contained in the leach solution recovered from the hydrolysis step is removed therefrom by distillation, and residual solution is re-cycled to the leaching step.

8. The process for the production of substantially pure tungstic acid which comprises the steps of:
    (a) leaching a tungstic acid containing material with a leach solution comprised of a member selected from the group consisting of ethylene glycol and glycerol to extract tungsten and dissolve it in the leach solution;
    (b) separating undissolved residue from the leach solution;
    (c) hydrolyzing the dissolved tungsten in the leach solution in the presence of water provided in amount at least sufficient to combine with and precipitate the dissolved tungsten content of said leach solution as tungstic acid substantially free from impurities;
    (d) separating precipitated tungstic acid from the leach solution; and
    (e) re-cyling leach solution to the leaching step of the process.

9. The process for the production of substantially pure tungstic acid which comprises the steps of:
    (a) leaching an impure tungstic acid containing mixture at a temperature above about 125° C. with a leach solution comprised of an alcohol selected from the group consisting of ethylene glycol and glycerol to extract tungsten and dissolve it in the leach solution;
    (b) separating undissolved residue from the leach solution;
    (c) hydrolyzing the dissolved tungsten in the leach solution in a hydrolysis step in the presence of hydrogen chloride provided in amount at least equal to about 0.25% by weight of the solution and water provided in amount at least sufficient to combine with the dissolved tungsten to form tungstic acid;
    (d) continuing said hydrolysis step to precipitate substantially all dissolved tungsten from the leach solution as tungstic acid substantially free from impurities; and
    (e) separating precipitated tungstic acid from the leach solution.

10. The process for the production of substantially pure tungstic acid from tungsten bearing ores and concentrates which comprises the steps of:
    (a) digesting the tungsten bearing material in an aqueous sulphuric acid solution to convert tungsten values to tungstic acid;
    (b) separating digested solids containing tungstic acid from the acid solution;
    (c) leaching the tungstic acid containing solids at a temperature above about 160° C. with a leach solution comprising a member selected from the group consisting of ethylene glycol and glycerol and from about 0.5 to about 2.0% by weight of the solution hydrogen chloride to extract tungsten and dissolve it in the leach solution;

(d) separating undissolved residue from the leach solution;

(e) hydrolyzing the dissolved tungsten in the leach solution in the presence of said hydrogen chloride by the addition of about 10 to about 40% water to the leach solution;

(f) continuing the hydrolysis of dissolved tungsten to precipitate tungstic acid from the leach solution substantially free from impurities;

(g) separating precipitated tungstic acid from the leach solution; and (h) re-cycling leach solution to the leaching step of the process.

References Cited by the Examiner

UNITED STATES PATENTS

| | | | |
|---|---|---|---|
| 984,143 | 2/11 | Lederer | 23—21 |
| 1,217,914 | 3/17 | Butterfield | 23—19 |
| 2,227,833 | 1/41 | Hixson et al. | 23—19 X |

MAURICE A. BRINDISI, *Primary Examiner.*